United States Patent [19]

Anthone et al.

[11] 4,001,033
[45] Jan. 4, 1977

[54] COMPOSITION AND METHOD FOR SOIL STABILIZATION

[76] Inventors: Robert Anthone, 602 N. Spruce, Valley, Nebr. 68064; Michael P. Parks, 9322 Oak St., Omaha, Nebr. 68124

[22] Filed: Sept. 26, 1974

[21] Appl. No.: 509,458

[52] U.S. Cl. .................... 106/287 SS; 106/123 C; 106/311; 106/315; 252/88; 252/351; 404/76
[51] Int. Cl.² .................... C08H 5/04; C08L 97/02; C09K 3/22; E01C 7/36
[58] Field of Search ....... 106/123 LC, 277, 287 SS, 106/12, 315; 61/36 R; 166/293; 252/351, 352, 88, DIG. 6; 404/76

[56] References Cited

UNITED STATES PATENTS

| | | | |
|---|---|---|---|
| 3,123,569 | 3/1964 | Borgfeldt | 106/277 X |
| 3,126,350 | 3/1964 | Borgfeldt | 106/277 X |
| 3,276,887 | 10/1966 | Pitchford | 106/277 |
| 3,345,193 | 10/1967 | Pitchford | 106/123 |
| 3,425,953 | 2/1969 | Cowan | 106/285 |
| 3,721,043 | 3/1973 | Van Doorne | 106/287 SS |

*Primary Examiner*—Joan E. Welcome
*Attorney, Agent, or Firm*—Henderson, Strom & Sturm

[57] ABSTRACT

A composition, useful for stabilizing soil, comprised of lignin sulfonate and a combination of dispersants, and a method of stabilizing soil utilizing the composition. The composition and method are particularly useful in preparing a road base.

5 Claims, No Drawings

COMPOSITION AND METHOD FOR SOIL STABILIZATION

BACKGROUND OF THE INVENTION

1. Field of the Invention

The construction of road base courses often requires the addition of a chemical composition to the soil particles utilized in the base course in order to improve the physical characteristics of the base course. Characteristics of the base courses which are affected by stabilization are density, adhesion, and stability against moisture and temperature extremes. A base course that is not properly stabilized is subject to formation of potholes, wash-boarding, frost-boils, dry weather flaking and wet weather leaching.

2. Description of the Prior Art

Soil stabilization has been used for many years in construction of road base courses. Materials commonly used for this purpose include lime, calcium chloride, sodium silicates, chrome-lignin, a mixture of molasses and fuel oil, calcium acrylate, lignin sulfonate and other materials. Lime has been widely used for many years as a means for reducing the shrinkage and plasticity index of soils having clay or caliche binders. Calcium chloride assists in the compactive process, making it possible to obtain greater densities and greater strengths with normal compactive efforts.

A waste material from pulp mills which utilize the sulfite process for digesting wood chips or sawdust has also been used as a soil stabilizing material. This material, referred to herein as lignin sulfonate, is a sodium, calcium or ammonium lignin sulfonate which is produced in large volume by the sulfite pulping process. As pointed out above, lignin sulfonate has been used for many years as a stabilizing agent. However, it has not been widely accepted by the road building industry. One of the reasons for its lack of acceptance on anything but secondary and tertiary roads is the failure of untreated lignin sulfonate to be uniformly distributed, resulting in untreated pockets within the base course materials.

U.S. Pat. No. 1,075,856 describes the use of modified sulfite waste liquor in soil stabilization.

U.S. Pat. Nos. 865,578; 2,375,019 and 3,053,019 also describe soil stabilizing compositions utilizing waste sulfite liquors in various forms.

None of the prior art references provides a composition which includes dispersant additives to improve the distribution of the lignin sulfonate throughout the soil to be stabilized. Thus, it is apparent that there has been a need for a soil stabilizing composition having the improved properties obtained by the present invention.

SUMMARY OF THE INVENTION

According to the present invention, the utility of lignin sulfonate as a soil stabilization agent is enhanced by incorporating into the lignin sulfonate an additive comprised of roughly equal parts of (1) a fatty acid ester of polyglycerol and (2) polyoxyethylene ethers of alkyl-substituted phenols. Substantial improvement in performance of lignin sulfonate has been obtained by the use of very small amounts of the additive package. For example, addition of one gallon of polyglycerol ester and one gallon of polyoxyethylene ethers of dialkyl phenols in ten thousand gallons of lignin sulfonate markedly improves the performance of soil stabilized thereby compared to soil stabilized with lignin sulfonate which does not contain the additives.

It is therefore an object of this invention to provide an improved method and composition for stabilizing soil utilizing lignin sulfonate as the primary stabilizing agent.

The above, as well as additional objects and advantages, is obtained by means of the present invention, as will be apparent from the following detailed description thereof.

DESCRIPTION OF THE PREFERRED EMBODIMENT

In accordance with the preferred embodiment of the invention, lignin sulfonate, previously described as a sulfonate salt obtained as a waste liquor from the sulfite digestion of wood pulp, is combined with a small amount of a combination of additives consisting of approximately equal parts of fatty acid ester of polyglycerol and polyoxyethylene ethers of diakyl phenols. This stabilizing composition is used in stabilizing soil such as a road base course with improved results.

Lignin sulfonate without the additives of this invention was used to stabilize soils, with less than satisfactory results. The most consistent problem noted was the unequal distribution of the lignin liquor throughout the soil particles of the finished base course. As a result, parts of the base course were not properly stabilized, such that excessive flaking occured in wet periods. Also, an excessive number of frost boils were noted.

Subsequently, lignin sulfonate containing 1 gallon of fatty acid ester of polyglycerol for each 10,000 gallons of lignin sulfonate was used utilizing the same construction methods used in the projects referred to above. A significant improvement in density after compaction was noted, and better distribution of the lignin sulfonate throughout the stabilized soil was evident after the base course had cured out. Further, fewer than the normal amount of frost boils were noted. However, the amount of flaking in dry periods and leaching in wet periods was still greater than was desirable.

A second additive (polyoxyethylene ether of dialkyl phenols) was then incorporated into lignin sulfonate in addition to the polyglycerol ester previously used. In order to compare the stabilization obtained utilizing the combined additives with the stabilization obtained utilizing only the polyglycerol ester additive, two concurrent projects were executed on similiar soil types utilizing the combined additives in one case and only the polyglycerol ester in the other. Identical procedures were used in each case except that 8 inches of material was stabilized with the single additive, and 6 inches with the combined additive. The base course stabilized with the lignin sulfonate containing the combined additives in accordance with the invention cured out rapidly, and a uniform penetration of the lignin sulfonate was noted. Similar results were noted for the base course stabilized with lignin sulfonate containing only the polyglycerol ester additive, so it was decided to leave both base courses uncovered during the late fall and winter so that a more thorough evaluation could be made in the following spring concerning how each exposed base course bore up under a Nebraska winter. Both roads were left open to traffic, and were equally drenched with exceptionally heavy fall rains. In the spring both roads were examined and prepared for seal coatings. The road stabilized with lignin sulfonate containing only polyglycerol needed to be rescarified and compacted in many places along its length, while the other road, stabilized according to the invention, required only tight blading, with little reshaping and compacting necessary.

The composition in accordance with the invention comprises lignin sulfonate as a primary ingredient, with small but essential amounts of each of a pair of additives added thereto. The first additive is a fatty acid ester of polyglycerol, which is a common and widely available dispersant material. The second additive is polyoxyethylene ether of dialkyl phenol, also a common and widely available material. As little as 0.5 gallons of combined additives in 10,000 gallons of lignin sulfonate is effective in providing improved soil stabilization, with about 2 gallons of combined additive per 10,000 gallons of lignin sulfonate being the preferred amount. Higher amounts of additive may be used with good results, but amounts much above the preferred amount are uneconomical.

It is preferred to use approximately equal amounts of each of the two additives, but a ratio of up to about four parts of either additive to one part of the other may be used.

The stabilizing composition of the invention may be used according to conventional procedures for stabilizing road base courses and the like. Pulverized soil is mixed and worked with the stabilizing composition in a single or multiple layer, compacting each layer as it is laid down. The compaction is by any suitable method such as rubber-tied rollers, sheepsfoot rollers or the like. The amount of stabilizing composition used depends on the type of soil, moisture content and other factors. The stabilizing composition, according to one preferred embodiment, may be diluted with an equal amount of water and then used in an amount of from 0.5 to 2.0 gallons per square yard per three inch lift. More generally, the stabilizing composition may be used, on a water-free basis, in an amount of from 0.5 to 2.0 percent by weight of the soil being stabilized. A preferred amount is about 1 percent by weight of stabilizing composition (water-free basis) based on weight of soil treated. The exact amount of stabilizing composition and the amount of water dilution vary with soil type, moisture content and other factors.

The stabilizing composition of this invention provides many advantages over lignin sulfonate as previously used. The density factor of the compacted soils stabilized according to the invention is from 6 to 12% higher than is obtained by comparable prior art methods. Dispersion and penetration of the ligning sulfonate is much better, and the binding action on the soil particles is improved. The incidence and severity of frost boils is reduced, as is flaking in dry weather and leaching in wet weather. The stabilizing composition of the invention will mix with water without requiring heating, and is non-toxic and non-corrosive. The composition is suitable for most in-place soils for use in a base course, and reduces dust, aggregate loss, pot holes and washboarding.

The stabilizing composition of the invention is preferably formulated by adding about 2 gallons of an equal mixture of a fatty acid ester of polyglycerol and polyoxyethylene ether of diakyl phenol to 10,000 gallons of lignin sulfonate and distributing the added material uniformly throughout the lignin sulfonate. The composition may be used as is or diluted with water depending on the moisture content of the material to be stabilized. The composition is mixed with and worked into the material to be stabilized in a conventional manner followed by compaction, and provides many advantages as previously recited.

We claim:

1. A composition for stabilizing soil particles comprising:
    a major part of lignin sulfonate; and
    a minor part of an additive consisting essentially of fatty acid ester of polyglycerol and polyoxyethylene ether of dialkyl phenol.

2. The composition of claim 1 wherein the additive is present in an amount of at least 0.5 gallons per 10,000 gallons of lignin sulfonate.

3. The composition of claim 1 wherein the fatty acid ester of polyglycerol and the polyoxyethylene ether of dialkyl phenol are present in approximately equal amounts by volume.

4. The composition of claim 3 wherein two parts by volume of additive are present for each 10,000 parts of lignin sulfonate.

5. A method of preparing a base course for a road comprising mixing with soil particles to be used for said base course a stabilizing composition comprising:
    a major part of lignin sulfonate; and
    a minor part of an additive consisting essentially of fatty acid ester of polyglycerol and polyoxyethylene ether of dialkyl phenol.

* * * * *